Oct. 22, 1940. H. W. BRUKER ET AL 2,219,065
DOUBLE BACKING MACHINE
Filed Sept. 24, 1938
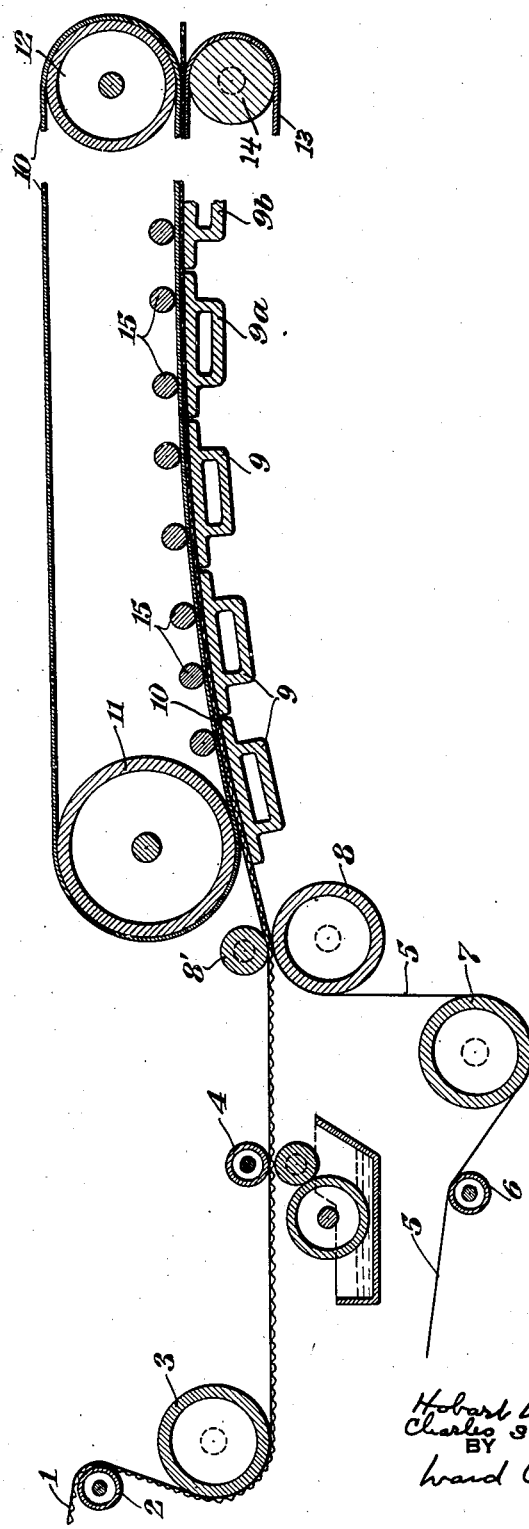
INVENTORS
Hobart W. Bruker
Charles S. Thorn
BY
Ward Crosby & Neal
ATTORNEYS Patented Oct. 22, 1940

2,219,065

UNITED STATES PATENT OFFICE 2,219,065

DOUBLE BACKING MACHINE

Hobart W. Bruker and Charles S. Thorn, Bordentown, N. J., assignors to George W. Swift, Jr. Inc., Bordentown, N. J., a corporation of New Jersey Application September 24, 1938, Serial No. 231,512

4 Claims. (Cl. 154—32)

This invention relates to machines of the type which are used to apply facing sheets to paper-board, with an adhesive bond between the layers. For example in the production of double-faced corrugated paper-board, so-called double-facing machines are used into which are continuously fed a sheet of single-faced corrugated paper with adhesive applied to the exposed peaks of the corrugations, and a facing sheet; and while in the machine the juxtaposed sheets are drawn along and pressed against a heating table to bond the facing sheet to the exposed peaks of the corrugations. The present invention aims primarily to provide a machine of the above character which will insure that the facing sheet is adequately and uniformly held in contact with the paper-board or single-faced paper throughout the areas to be bonded, thereby to secure a better bond between the layers than has been possible with existing machines. In the drawing the single figure is a central vertical section of a machine constructed to operate in accordance with the invention, the view being largely diagrammatic and omitting parts of the machine with the details of which the present invention is not particularly concerned, and which may be assumed to be of any known or appropriate construction.

In the manufacture of double-faced corrugated paper-board it has been customary for many years to draw the juxtaposed sheets along the surface of a flat heating table by means of endless conveyor belts of canvas or the like which overlie the paper-board and the table, weight rolls or the like being located at spaced intervals above the active passes of the belts and resting upon the latter to press the belts against the paper-board to cause the areas to be bonded to be pressed toward each other. The pressure of the weight rolls (applied at spaced points) has been primarily relied upon to press the layers together while being bonded, and there has been a tendency to produce a defective bond, owing to the fact that the pressure on the paper-board was not adequately maintained at points between the weight rolls, thus intermittently releasing the areas to be bonded while the adhesive was setting and producing a weak bond. This defect in operation is likely to be particularly serious in the initial stages of the double-backing operation, where the adhesive is beginning to set or crystallize under the action of the heating table.

In accordance with the present invention we provide the heating table with a sheet-engaging portion, preferably located at or near its entrance end, which is so shaped that the tension upon the active passes of the conveyor belts causes them to be pulled toward the heating table and thus compress the areas to be bonded firmly and uniformly together and toward the table. This compressive action of the belts is exerted continuously along the length of the above portion of the table and thus keeps the layers in intimate contact at substantially all points between the weight rolls, if the latter be used. And even though the belts should not be positioned to engage the paper web closely in the above mentioned part of the machine, the tension on the corresponding part of the web which is produced by subsequent engagement of the belts therewith, will cause the length of the web which is passing through the above mentioned part of the machine to be pulled toward the table, thus holding the corresponding areas to be bonded firmly together throughout and promoting the formation of a superior bond.

The drawing illustrates the invention as carried out by a double-backing machine to which a length 1 of single-faced corrugated paper is continuously supplied after being conducted past a so-called hug roll 2, a preheater drum 3, and an adhesive-applying mechanism 4 which applies adhesive to the exposed peaks of the corrugations of web 1 and which need not be described in detail since it may be of known construction. A facing sheet 5 to be applied to the web 1 is led over a hug-roll 6 and preheater drums 7 and 8, and a pressure roll 8' above drum 8 presses the facing sheet 5 into contact with the exposed peaks of the corrugations on the underside of web 1 to which adhesive has been applied as above described.

The heating table above referred to may consist of a series of steam plates 9, having interior chambers to which steam is supplied in known manner, and over the surface of which the webs 1 and 5 are drawn by a suitable number of endless conveyor belts 10 passing around a roller 11 at the entrance end of the machine, and a roller 12 at the delivery end of the machine. The roller 12 may be made the driving roller for belts 10, thus creating a certain amount of tension in their active passes and causing them to draw the newly made double-faced paper-board progressively over the steam plates 9. At the delivery end of the machine, as indicated schematically at the right of the figure, a further set of similar conveyor belts 13 passing around a roller 14 may be employed, which do not extend forwardly to the initial heating section of the machine, as in known constructions.

In order to enable the machine to operate in accordance with the present invention, a portion of the sheet-engaging surface of the heating table, preferably at the entrance end thereof, is somewhat convexly shaped in a direction longitudinal with respect to the heating table, in such manner that the adjacent portions of belts 10, which are guided by the roller 11 and associated parts which may include a series of weight rolls 15 of known construction, become slightly bent or bowed. The tension on the active passes of the belts which is imposed by roller 12, causes their above portions to press the corresponding length of paper-board firmly against the heating table substantially continuously and uniformly throughout the length of this convexed portion of the heating table. In other words, on account of the convex curvature of the above mentioned portion of the heating table, the tension upon the belts instead of being in a direction parallel to the heating table as heretofore, is oblique to the sheet-engaging surface of such portion of the heating table, and therefore has a component of force which directly compresses the layers of the paper-board toward the heating table and holds them in intimate contact with each other. Thus the invention relies primarily upon special shaping of the sheet engaging surface of the heating table in conjunction with the tension upon the active passes of the conveyor belts, to cause this tension to compress the paper-board positively and continuously throughout the length thereof which is at the moment in the above mentioned portion of the machine. By referring to the aforesaid portion of the heating table as convexly shaped, we do not mean that it necessarily is of regular or continuously curved contour in a direction lengthwise of the machine, although a slight arcuate i. e. cylindrical curvature is preferred as being simplest and sufficient for the purposes of the invention. It is not desirable that the newly made paper-board be sharply bent, nor that a pressure be applied thereto which is high enough to crush the corrugations.

In the illustrated form of the invention the sheet-engaging surfaces of the first three steam plates 9 at the entrance end of the machine may occupy for example about eight feet lengthwise of the machine, and may be cylindrically curved on a radius of about 50 to 60 ft., while the remaining steam plates 9a, 9b, etc., may be made flat in accordance with usual practice. Thus the sheet engaging surface of the heating table at its entrance end is slightly depressed below the general level of the table, and from the entrance end toward the delivery end such sheet-engaging surface rises gradually until it merges with the general level of the table at steam plate 9a.

The active passes of the belts 10, adjacent the entrance end of the machine, conform in contour to the convexly shaped portion of the heating table and the tension on the belts insures that pressure will be continuously maintained throughout the length of the corresponding portion of the paper-board as above described, the convexity however being made so slight and gradual that the belts neither compress the paper-board sufficiently to crush the corrugations nor bend it sharply. Preferably the heating table is shaped to produce the above compressive action of the belts at or near the entrance end of the heating table so that layers of the webs are continuously held in intimate contact during the early stages of the setting of the adhesive, after which the remaining sections of the heating table and associated parts may if desired be exactly like the prior art in construction and mode of operation.

While the invention has been described as carried out by a machine of one particular construction it should be understood that changes therein may be made without departing from the invention in its broader aspects, within the scope of its appended claims.

We claim:

1. A double-facing machine having a stationary heating table, means for supplying to said heating table a paper-board sheet and a facing sheet to be applied thereto, conveyor belts extending along the table, means for tensioning said belts and for moving them along over the table to draw the sheets so supplied along the heating table, said heating table having a sheet engaging portion which is convexly shaped whereby the tension on the conveyor belts causes them to press the corresponding length of the sheets substantially continuously toward the aforesaid portion of the heating table.

2. A double-facing machine having a stationary heating table, means for supplying to said heating table a paper-board sheet and a facing sheet to be applied thereto, said heating table having a sheet engaging portion adjacent its entrance end which is depressed below the general level of the table, and is shaped to extend gradually upward toward said general level in the direction of the delivery end of the table, a conveyor belt extending along the table and means for tensioning said belt and for moving said belt along over the table to feed the sheets along the table including a roller constructed and arranged to depress the portion of the belt which is adjacent the above mentioned portion of the heating table to cause said portion of the belt to press the corresponding length of the sheets substantially continuously toward the aforesaid portion of the heating table.

3. A double-facing machine having a stationary heating table provided with a sheet engaging portion adjacent its entrance end which is depressed below the general level of the table and arcuately curved to merge gradually into said general level, a conveyor belt extending along the table, means for tensioning said belt and for moving said belt along over the table to draw the sheets so supplied along the heating table, said machine including a belt guiding means which is constructed and arranged to cause the belt to be bowed arcuately in the portion thereof which is adjacent the aforesaid portion of the heating table.

4. A double-facing machine having a stationary heating table, means for supplying to said heating table a paper-board sheet and a facing sheet to be applied thereto, said heating table having a sheet engaging portion which is convexly shaped, and means for drawing said sheets along the heating table to bend said sheets to conform to the shape of said sheet engaging portion and thereby hold the corresponding portions of the sheets in intimate contact substantially throughout the length of said sheet engaging portion.

HOBART W. BRUKER.
CHARLES S. THORN.